US012489502B2

(12) United States Patent
Wang et al.

(10) Patent No.: US 12,489,502 B2
(45) Date of Patent: Dec. 2, 2025

(54) METHOD AND USER EQUIPMENT FOR DETERMINING PRECODER OF MIMO SYSTEM

(71) Applicant: MEDIATEK INC., Hsin-Chu (TW)

(72) Inventors: Chien-Yi Wang, Hsin-Chu (TW); Jiann-Ching Guey, Hsin-Chu (TW); Cheng-Rung Tsai, Hsin-Chu (TW); Wei-Yen Wong, Hsin-Chu (TW)

(73) Assignee: MEDIATEK Inc., Hsinchu (TW)

( * ) Notice: Subject to any disclaimer, the term of this patent is extended or adjusted under 35 U.S.C. 154(b) by 240 days.

(21) Appl. No.: 17/885,480

(22) Filed: Aug. 10, 2022

(65) Prior Publication Data

US 2023/0064830 A1 Mar. 2, 2023

Related U.S. Application Data

(60) Provisional application No. 63/236,709, filed on Aug. 25, 2021.

(51) Int. Cl.
*H04W 4/00* (2018.01)
*H04B 7/06* (2006.01)

(52) U.S. Cl.
CPC ......... *H04B 7/0626* (2013.01); *H04B 7/0634* (2013.01)

(58) Field of Classification Search
CPC .. H04B 7/0478; H04B 7/0626; H04B 7/0634; H04B 7/0434
USPC ................................................. 370/329, 330
See application file for complete search history.

(56) References Cited

U.S. PATENT DOCUMENTS

| 2017/0195017 | A1 | 7/2017 | Kim et al. | ........... H04B 7/0417 |
| 2019/0326959 | A1* | 10/2019 | Davydov | ............. H04B 7/0469 |
| 2022/0416868 | A1* | 12/2022 | Schreck | ............... H04L 5/0048 |
| 2023/0128138 | A1* | 4/2023 | Li | ......................... H04L 5/0057 |
| | | | | 370/329 |
| 2023/0268964 | A1* | 8/2023 | Hadani | ............... H04W 64/003 |
| | | | | 375/262 |

FOREIGN PATENT DOCUMENTS

| CN | 102035625 A | 4/2011 |
| CN | 106537809 A | 7/2014 |

(Continued)

OTHER PUBLICATIONS

Taiwan IPO, office action for the Taiwanese patent application 111131997 (no English translation is available), dated Dec. 20, 2022 (10 pages).

(Continued)

*Primary Examiner* — Chuong T Ho
(74) *Attorney, Agent, or Firm* — Helen Mao; Imperium Patent Works

(57) ABSTRACT

Method and UE are provided for determining precoder of MIMO system. In particular, a BS can transmit at least one CSI-RS to the UE. The UE can receive the at least one CSI-RS, and estimate at least one covariance matrix of at least one downlink channel matrix according to the at least one CSI-RS at different times and frequencies. Then, the UE can transmit the at least one covariance matrix or at least one parameter associated with the least one covariance matrix to the BS for the BS to reconstruct at least one covariance matrix, and determine a precoder according to the at least one reconstructed covariance matrix.

17 Claims, 5 Drawing Sheets

(56) References Cited

FOREIGN PATENT DOCUMENTS

| CN | 109039407 | A  | 12/2018 |
| CN | 109314559 | A  | 2/2019  |
| WO | 2018118677 | A2 | 6/2018  |
| WO | 2020180221 | A1 | 9/2020  |

OTHER PUBLICATIONS

China Intellectual Property Office Action 202211019876.1, Dated Mar. 21, 2025.
3GPP TSG RAN WG1 Meeting #87 R1-1611241, Nov. 5, 2016, "DL CSI-RS design for NR CSI acquisition".

* cited by examiner

METHOD AND USER EQUIPMENT FOR DETERMINING PRECODER OF MIMO SYSTEM

CROSS REFERENCE TO RELATED APPLICATIONS

This application claims the benefit under 35 U.S.C. § 119 from U.S. provisional application Ser. No. 63/236,709, entitled "MIMO CSI exploiting time domain correlation," filed on Aug. 25, 2021, the subject matter of which is incorporated herein by reference.

TECHNICAL FIELD

The disclosed embodiments relate generally to wireless communication, and, more particularly, to method and user equipment for determining precoder of multi-input multi-output (MIMO) system.

BACKGROUND

In conventional network of 3rd generation partnership project (3GPP) 5G new radio (NR), the user equipment (UE) can measure channel state information reference signals (CSI-RSs) transmitted from a base station (BS) under a multi-input multi-output (MIMO) network, and determine downlink channel matrices according to the CSI-RSs. Then, the UE can calculate precoder(s) based on the downlink channel matrices, and report the compressed/quantized precoder(s) through precoding matrix indicator(s) (PMIs) to the BS using one of the specified codebooks. Therefore, the BS can transmit subsequent physical downlink shared channels (PDSCHs) by applying the precoder(s). However, the subsequent transmission of PDSCHs applied by the precoder(s) may be serious distorted due to the inaccurate calculation of the precoder(s) calculated and reported by the UE.

SUMMARY

Method and user equipment (UE) are provided for determining precoder of multi-input multi-output (MIMO) system. In particular, a base station (BS) can transmit at least one channel state information-reference signal (CSI-RS) to the UE. The UE can receive the at least one CSI-RS, and estimate at least one covariance matrix of at least one downlink channel matrix according to the at least one CSI-RS at different times and frequencies. Then, the UE can transmit the at least one covariance matrix or at least one parameter associated with the least one covariance matrix to the BS for the BS to reconstruct at least one covariance matrix, and determine a precoder according to the at least one reconstructed covariance matrix.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
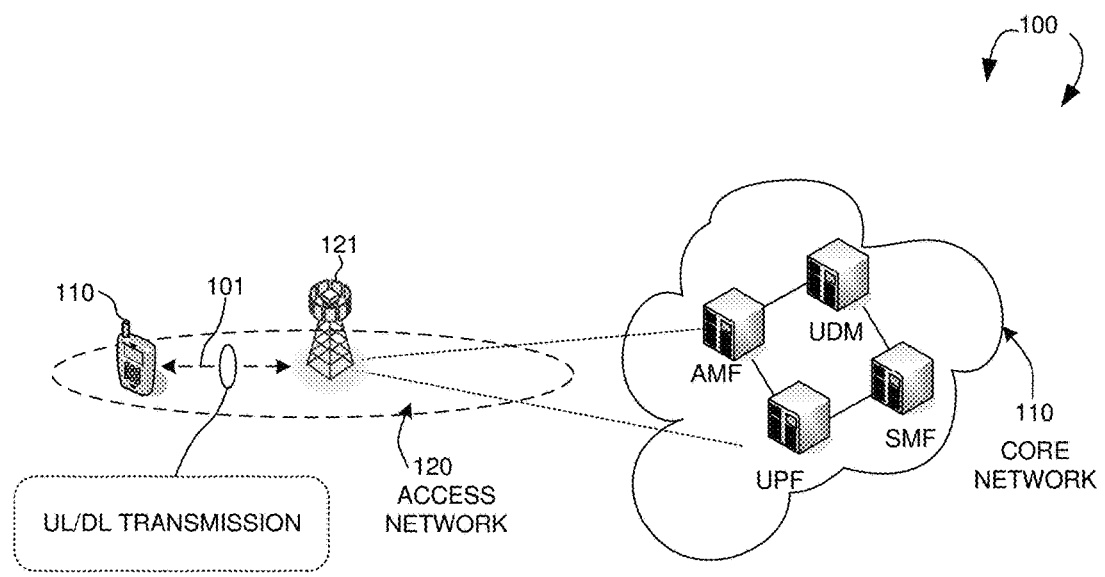
FIG. 1 illustrates an exemplary 5G new radio network supporting determination of precoder of multi-input multi-output (MIMO) system in accordance with embodiments of the current invention.

FIG. 1 illustrates an exemplary 5G new radio (NR) network 100 supporting determination of precoder(s) of multi-input multi-output (MIMO) system in accordance with aspects of the current invention. The 5G NR network 100 includes a user equipment (UE) 110 communicatively connected to a gNB 121 operating in a licensed band (e.g., 30 GHz-300 GHz for mmWave) of an access network 120 which provides radio access using a Radio Access Technology (RAT) (e.g., the 5G NR technology). The access network 120 is connected to a 5G core network 130 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy. The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

The gNB 121 may provide communication coverage for a geographic coverage area in which communications with the UE 110 is supported via a communication link 101. The communication link 101 shown in the 5G NR network 100 may include UL transmissions from the UE 110 to the gNB 121 (e.g., on the Physical Uplink Control Channel (PUCCH) or Physical Uplink Shared Channel (PUSCH)) or downlink (DL) transmissions from the gNB 121 to the UE 110 (e.g., on the Physical Downlink Control Channel (PDCCH) or Physical Downlink Shared Channel (PDSCH)).

Figure 2:
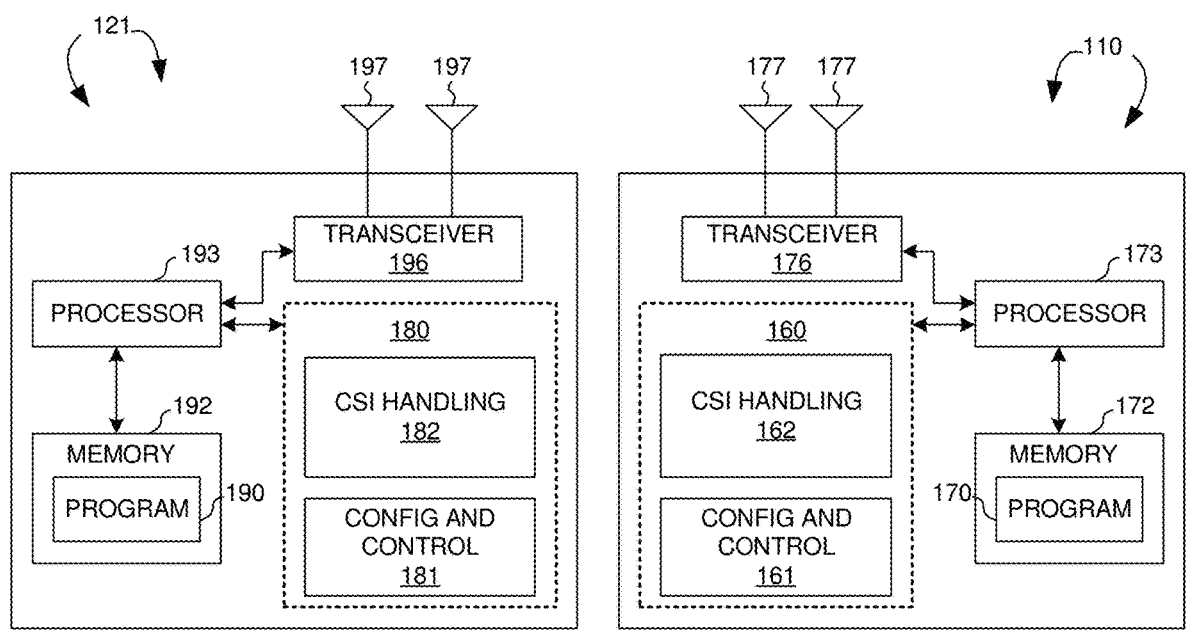
FIG. 2 is a simplified block diagram of the gNB and the UE in accordance with embodiments of the current invention.

FIG. 2 is a simplified block diagram of the gNB 121 and the UE 110 in accordance with embodiments of the present invention. For the gNB 121, antennas 197 transmit and receive radio signal under MIMO network. A radio frequency (RF) transceiver module 196, coupled with the antennas, receives RF signals from the antennas, converts them to baseband signals and sends them to processor 193. RF transceiver 196 also converts received baseband signals from the processor 193, converts them to RF signals, and sends out to antennas 197. Processor 193 processes the received baseband signals and invokes different functional modules and circuits to perform features in the gNB 121. Memory 192 stores program instructions and data 190 to control the operations of the gNB 121.

Similarly, for the UE 110, antennas 177 transmit and receives RF signal under MIMO network. RF transceiver module 176, coupled with the antennas, receives RF signals from the antennas, converts them to baseband signals and sends them to processor 173. The RF transceiver 176 also converts received baseband signals from the processor 173, converts them to RF signals, and sends out to antennas 177. Processor 173 processes the received baseband signals and invokes different functional modules and circuits to perform features in the UE 110. Memory 172 stores program instructions and data 170 to control the operations of the UE 110.

Although a specific number of the antennas 177 and 197 are depicted in FIG. 2, it is contemplated that any number of the antennas 177 and 197 may be introduced under the MIMO network.

The gNB 121 and the UE 110 also include several functional modules and circuits that can be implemented and configured to perform embodiments of the present invention. In the example of FIG. 2, the gNB 121 includes a set of control functional modules and circuit 180. Channel state information (CSI) handling circuit 182 handles CSI and associated network parameters for the UE 110. Configuration and control circuit 181 provides different parameters to configure and control the UE 110. The UE 110 includes a set of control functional modules and circuit 160. CSI handling circuit 162 handles CSI and associated network parameters. Configuration and control circuit 161 handles configuration and control parameters from the gNB 121.

Note that the different functional modules and circuits can be implemented and configured by software, firmware, hardware, and any combination thereof. The function modules and circuits, when executed by the processors 193 and 173 (e.g., via executing program codes 190 and 170), allow the gNB 121 and the UE 110 to perform embodiments of the present invention.

Figure 3:
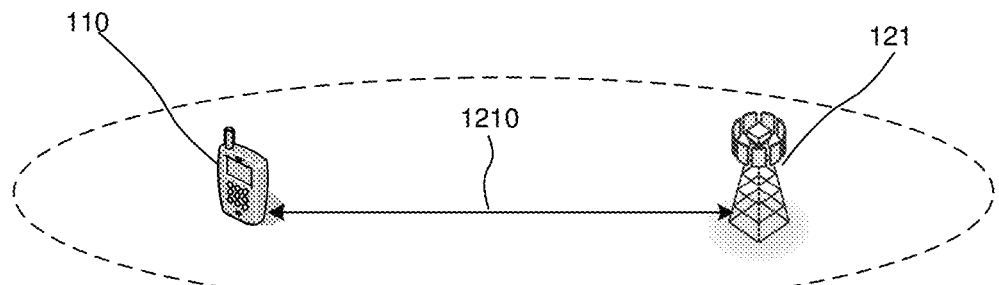
FIG. 3 illustrates one embodiment of message transmissions in accordance with embodiments of the current invention.

FIG. 3 illustrates one embodiment of message transmissions in accordance with one novel aspect. In particular, the gNB 121 transmits at least one channel state information reference signal (CSI-RS) 1210 to the UE 110. The UE 110 receives the at least one CSI-RS 1210 from the gNB 121.

Then, the UE 110 estimates at least one covariance matrix of at least one downlink channel matrix according to the at least one CSI-RS at different times and frequencies. The UE 110 transmits the at least one covariance matrix or at least one parameter associated with the least one covariance matrix to the BS 121.

After receiving the at least one covariance matrix or the at least one parameter associated with the least one covariance matrix, the BS 121 can: (1) derive a precoder according to the at least one covariance matrix; or (2) reconstruct the at least one covariance matrix based on the at least one parameter associated with the least one covariance matrix and derive the precoder according to the at least one covariance matrix.

In some embodiments, the UE 110 estimates the covariance matrices of the downlink channel matrix according to the CSI-RSs at different times and frequencies. In particular, after receiving the CSI-RSs at different times and frequencies, the UE 110 estimates the downlink channel matrices $H[n,m]$ of $n_R \times n_T$ MIMO channels as below:

$$H[n,m] = \begin{bmatrix} h_{11}[n,m] & \cdots & h_{1n_T}[n,m] \\ \vdots & \ddots & \vdots \\ h_{n_R 1}[n,m] & \cdots & h_{n_R n_T}[n,m] \end{bmatrix}$$

$n_R$ is the number of receiving antennas (i.e., antennas 177). $n_T$ is number of transmitting antennas (i.e., antennas 197). n is time domain index. m is frequency domain index.

Then, the UE 110 estimates covariance matrices $\Psi[n,m]$ based on the downlink channel matrices $H[n,m]$ as below:

$$\Psi[n,m] = H^H[n,m]H[n,m]$$

It is noted that $\Psi[n,m]$ should be $\hat{H}^H[n,m]\hat{H}[n,m]$ while $\hat{H}[n,m]=\Phi[n,m]H[n,m]$ and $\Phi[n,m]$ is time-frequency offset. Because $\Phi[n,m]$ is diagonal matrix with unit-phase factors, $\Phi^H[n,m]\Phi[n,m]$ is I which is an identity matrix. Accordingly, $$\Psi[n,m] = H^H[n,m]\Phi^H[n,m]\Phi[n,m]H[n,m] =$$
$$H^H[n,m]IH[n,m] = H^H[n,m]H[n,m]$$

which means the time-frequency offset $\Phi[n,m]$ can be ignored while the UE 110 estimates covariance matrices $\Psi[n,m]$.

Figure 4A:
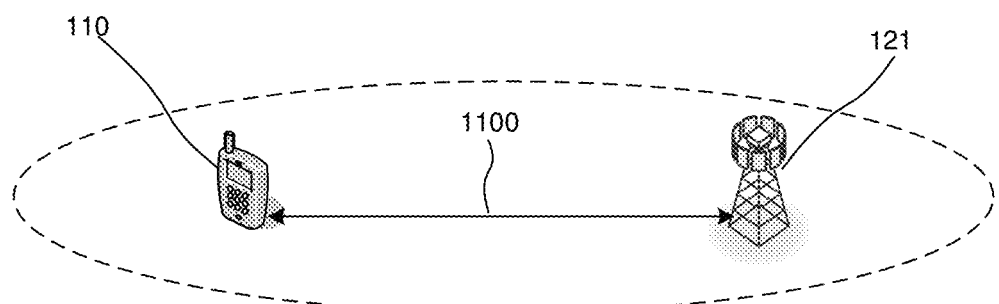
FIGS. 4A to 4F illustrate embodiments of messages transmissions in accordance with embodiments of the current invention.

In some implementations, as shown in FIG. 4A, the UE 110 transmits a CSI 1100 including the covariance matrices $\Psi[n,m]$ to the BS 121. Therefore, the BS 121 can derive precoders W from the covariance matrices $\Psi[n,m]$ with e.g., eigenvalue decomposition or singular value decomposition (SVD).

Then, the BS 121 transmits subsequent PDSCHs to the UE 110 by using the precoders W.

In some implementations, the UE 110 compresses the covariance matrices $\Psi[n,m]$, and transmits at least one parameter associated with the compressed covariance matrices to the BS 121. In particular, $\psi_{ij}[n,m]$ represents an entry in row i and column j of $\Psi[n,m]$. Each entry $\psi_{ij}$ of covariance matrix $\Psi[n,m]$ is considered as a function of time n and frequency m. The entries $\psi_{ij}$ at different times (N number in total) and frequencies (M number in total) form $\Psi[n,m]$.

The covariance matrices $\Psi[n,m]$ are compressed by: (1) being projected onto two-dimension (2D) time-frequency basis matrices; or (2) being represented as linear combination of 2D sinusoids matrices. A 2D sinusoids matrix has the entry in row n and column m as $e^{-j2\pi m\tau}e^{j2\pi nv}$, where $\tau$ models delay and $v$ models Doppler shift. More specifically, after compression, the compressed covariance matrices can be represented as:

$$\Psi_{ij}[n,m] = \sum_{l=1}^{n}\sum_{k=1}^{m} c_{ijkl}B_{kl}$$

while $B_{kl}$ is known parameter by both the UE 110 and the BS 121.

Figure 4B:
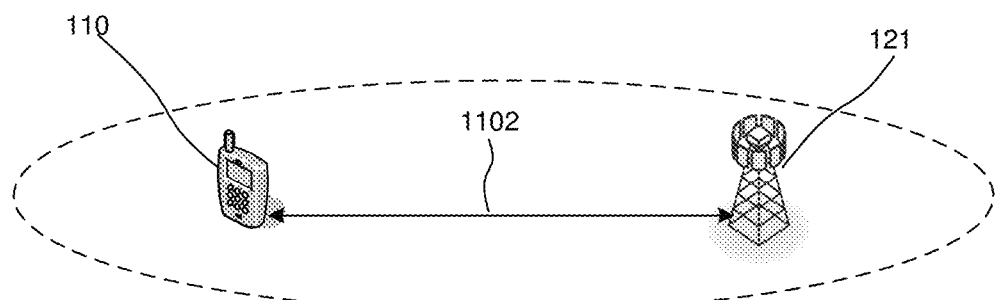

The UE 110 selects a subset $S_{ij}$ from the 2D time-frequency basis matrices (or from the 2D sinusoids matrices) and coefficients $(c_{ijkl}:(k,l)\in S_{ij})$ corresponding to the subset, and then, as shown in FIG. 4B, transmits a CSI 1102 including the subset $S_{ij}$ and the corresponding coefficients $(c_{ijkl}:(k,l)\in S_{ij})$ to the BS 121.

Then, the BS 121 reconstructs covariance matrices $\Psi_{ij}$ by $\Psi_{ij}\approx\sum_{(k,l)\in S_{ij}}c_{ijkl}B_{kl}$ according to the subset $S_q$ and the corresponding coefficients $(c_{ijkl}:(k,l)\in S_{ij})$, and derives precoders W from the covariance matrices $\Psi[n,m]$ with e.g., eigenvalue decomposition or SVD.

Then, the BS 121 transmits subsequent PDSCHs to the UE 110 by using the precoders W.

In some implementations, the UE 110 compresses the covariance matrices $\Psi[n,m]$, and transmits at least one parameter associated with the compressed covariance matrices to the BS 121. In particular, $\psi_{ij}[n,m]$ represents an entry in row i and column j of $\Psi[n,m]$. Each entry $\psi_{ij}$ of covariance matrix $\Psi[n,m]$ is considered as a function of time n and frequency m. The entries $\psi_{ij}$ at different frequencies (M number in total) in time n form vectors $\psi_{ij}[n]$.

The vectors $\psi_{ij}[n]$ are compressed by: (1) being projected onto one-dimension (1D) frequency basis vectors; or (2) being represented as linear combination of 1D sinusoids vectors. A 1D sinusoids vector has the m-th entry as $e^{-j2\pi m\tau}$, where $\tau$ models delay. More specifically, after compression, the compressed vectors can be represented as:

$$\psi_{ij}[n]=\Sigma_{k=1}^{M}c_{ijk}[n]b_k$$

while $b_k$ is known parameter by both the UE 110 and the BS 121.

Figure 4C:
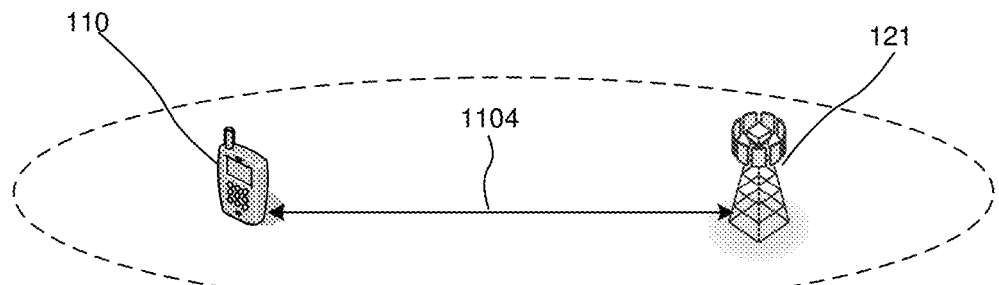

The UE 110 selects a subset $S_{ij}[n]$ from the 1D frequency basis vectors (or from the 1D sinusoids vectors) and coefficients ($c_{ijk}[n]$: $k\in S_{ij}[n]$) corresponding to the subset $S_{ij}[n]$, and then, as shown in FIG. 4C, transmits a CSI 1104 including the subset $S_{ij}[n]$ and the corresponding coefficients ($c_{ijk}[n]$:$k\in S_{ij}[n]$) to the BS 121.

Then, the BS 121 reconstructs vectors $\psi_{ij}[n]$ by $\psi_{ij}[n]\approx\Sigma_{k\in S_{ij}[n]}c_{ijk}[n]b_k$ according to the subset $S_{ij}[n]$ and the corresponding coefficients ($c_{ijk}[n]$:$k\in S_{ij}[n]$). Next, the BS 121 reconstructs the covariance matrices $\Psi[n,m]$ based on the vectors $\psi_{ij}[n]$, and then derives precoders W from the covariance matrices $\Psi[n,m]$ with e.g., eigenvalue decomposition or SVD.

Then, the BS 121 transmits subsequent PDSCHs to the UE 110 by using the precoders W.

In some implementations, the UE 110 calculates (or approximates) a decomposition of the covariance matrices $\Psi[n,m]$ as:

$$\Psi[n,m]=U^H[n,m]U[n,m]$$

Next, the UE 110 compresses the decomposition matrices $U[n,m]$ and transmits at least one parameter associated with the decomposition matrices of the covariance matrices to the BS 121. In particular, $u_{ij}[n,m]$ represents an entry in row i and column j of $U[n,m]$. The entries $u_{ij}$ at different times (N number in total) and frequencies (M number in total) form matrices $U_{ij}$.

The matrices $U_{ij}$ are compressed by: (1) being projected onto 2D time-frequency basis matrices; or (2) being represented as linear combination of 2D sinusoids matrices. More specifically, after compression, the compressed decomposition matrices can be represented as:

$$U_{ij}=\sum_{l=1}^{N}\sum_{k=1}^{M}c_{ijkl}B_{kl}$$

while $B_{kl}$ is known parameter by both the UE 110 and the BS 121.

Figure 4D:
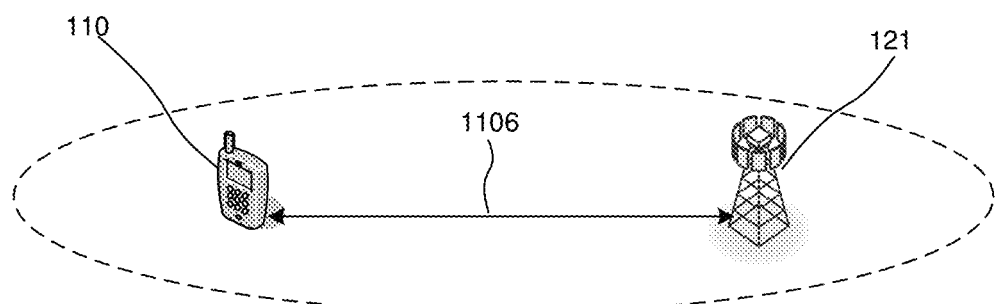

The UE 110 selects a subset $S_{ij}$ from the 2D time-frequency basis matrices (or from the 2D sinusoids matrices) and coefficients ($c_{ijkl}$:$(k,l)\in S_{ij}$) corresponding to the subset, and then, as shown in FIG. 4D, transmits a CSI 1106 including the subset $S_{ij}$ and the corresponding coefficients ($c_{ijkl}$:$(k,l)\in S_{ij}$) to the BS 121.

Then, the BS 121 reconstructs matrices $U_{ij}$ by $U_{ij}=\Sigma_{(k,l)\in S_{ij}}c_{ijkl}B_{kl}$ according to the subset $S_{ij}$ and the corresponding coefficients ($c_{ijkl}$:$(k,l)\in S_{ij}$). The BS 121 reconstructs covariance matrices $\Psi[n,m]$ from $U_{ij}$ and derives precoders W from the covariance matrices $\Psi[n,m]$ with e.g., eigenvalue decomposition or singular value decomposition (SVD).

Then, the BS 121 transmits subsequent PDSCHs to the UE 110 by using the precoders W.

In some implementations, the UE 110 calculates (or approximates) a decomposition of the covariance matrices $\Psi[n,m]$ as:

$$\Psi[n,m]=U^H[n,m]U[n,m]$$

Next, the UE 110 compresses the decomposition matrices $U[n,m]$ and transmits at least one parameter associated with the decomposition matrices of the covariance matrices to the BS 121. In particular, $u_{ij}[n,m]$ represents an entry in row i and column j of $U[n,m]$. The entries $u_{ij}$ at different frequencies (M number in total) in time n form vector $U_{ij}[n]$.

The vectors $U_{ij}[n]$ are compressed by: (1) being projected onto 1D frequency basis vectors; or (2) being represented as linear combination of 1D sinusoids vectors.

More specifically, after compression, the compressed decomposition vector can be represented as:

$$U_{ij}[n]=\Sigma_{k=1}^{M}c_{ijk}[n]b_k$$

while $b_k$ is known parameter by both the UE 110 and the BS 121.

Figure 4E:
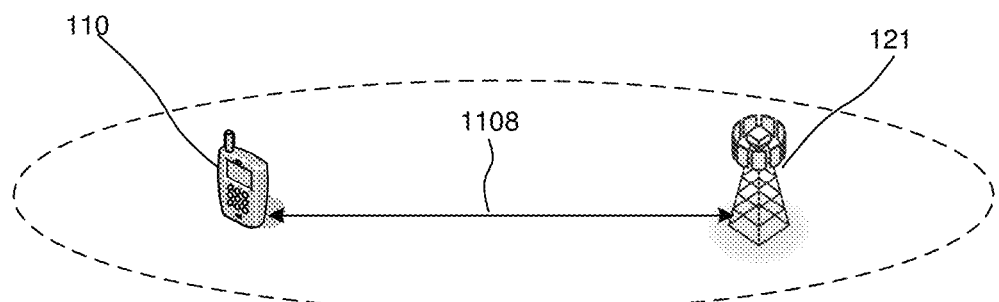

The UE 110 selects a subset $S_{ij}[n]$ from the 1D frequency basis vectors (or from the 1D sinusoids vectors) and coefficients ($c_{ijk}[n]$:$k\in S_{ij}[n]$) corresponding to the subset, and then, as shown in FIG. 4E, transmits a CSI 1108 including the subset $S_{ij}[n]$ and the corresponding coefficients ($c_{ijk}[n]$: $k\in S_{ij}[n]$) to the BS 121.

Then, the BS 121 reconstructs vectors $U_{ij}[n]$ by $U_{ij}[n]=\Sigma_{k\in S_{ij}[n]}c_{ijk}[n]b_k$ according to the subset $S_{ij}[n]$ and the corresponding coefficients ($c_{ijk}[n]$:$k\in S_{ij}[n]$), and reconstructs covariance matrices $\Psi[n,m]$ from $U_{ij}[n]$ and derives precoders W from the covariance matrices $\Psi[n,m]$ with e.g., eigenvalue decomposition or singular value decomposition (SVD).

Then, the BS 121 transmits subsequent PDSCHs to the UE 110 by using the precoders W.

In some implementations, the UE 110 calculates (or approximates) a decomposition of the covariance matrices $\Psi[n,m]$ as:

$$\Psi[n,m]=U^H[n,m]U[n,m],$$

where $U[n,m]$ can be further decomposed into two terms $U_v[n,m]$ and $U_f$. $U_v[n,m]$ is time-frequency varying and $U_f$ is time-frequency fixed. For example, $U[n,m]$ is a matrix product of $U_v[n,m]$ and $U_f$, which means $U[n,m]=U_v[n,m]U_f$ or $U_fU[n,m]=U_v[n,m]$.

In some implementations, $U_v[n,m]$ includes singular vectors and $U_f$ includes average of squared rooted singular values. In some implementations, $U_v[n,m]$ includes squared rooted singular values and $U_f$ includes average of singular vectors Next, the UE 110 compresses the decomposition matrices $U_v[n,m]$ and transmits at least one parameter associated with the decomposition matrices of the covariance matrices to the BS 121. In particular, $u_{v,ij}[n,m]$ represents an entry in row i and column j of $U_v[n,m]$. The entries $u_{v,ij}$ at different times (N number in total) and frequencies (M number in total) form matrices $U_{v,ij}$.

The matrices $U_{v,ij}$ are compressed by: (1) being projected onto 2D time-frequency basis matrices; or (2) being represented as linear combination of 2D sinusoids matrices. More specifically, after compression, the compressed decomposition matrices can be represented as:

$$U_{v,ij}=\sum_{l=1}^{N}\sum_{k=1}^{M}c_{ikl}B_{kl}$$

while $B_{kl}$ is known parameter by both the UE 110 and the BS 121.

Figure 4F:
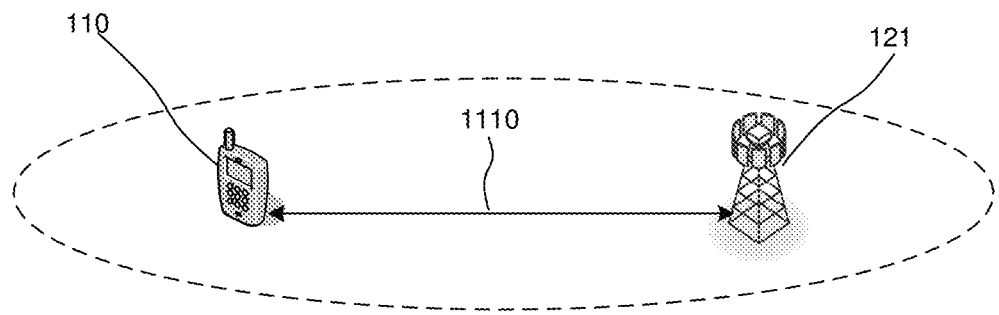

The UE 110 selects a subset $S_{ij}$ from the 2D time-frequency basis matrices (or from the 2D sinusoids matrices) and coefficients ($c_{ijkl}$:(k,l)∈$S_{ij}$) corresponding to the subset, and then, as shown in FIG. 4F transmits a CSI 1110 including the $U_f$, the subset $S_{ij}$ and the corresponding coefficients ($c_{ijkl}$:(k,l)∈$S_{ij}$) to the BS 121.

Then, the BS 121 reconstructs matrices $U_{v,ij}$ by $U_{v,ij}=\Sigma_{(k,l)\in S_i}c_{ikl}B_{kl}$ according to the subset $S_{ij}$ and the corresponding coefficients ($c_{ijkl}$:(k,l)∈$S_{ij}$), and reconstructs the covariance matrices $\Psi[n,m]$ from the $U_{v,ij}$ and the $U_f$. The BS 121 derives precoders W from the covariance matrices $\Psi[n,m]$ with e.g., eigenvalue decomposition or singular value decomposition (SVD).

Then, the BS 121 transmits subsequent PDSCHs to the UE 110 by using the precoders W.

In some implementations, the UE 110 calculates (or approximates) a decomposition of the covariance matrices $\Psi[n,m]$ as:

$$\Psi[n,m]=U^H[n,m]U[n,m],$$

where U[n,m] can be further decomposed into two terms $U_v[n,m]$ and $U_f$. $U_v[n,m]$ is time-frequency varying and $U_f$ is time-frequency fixed. For example, U[n,m] is a matrix product of $U_v[n,m]$ and $U_f$, which means $U[n,m]=U_v[n,m]U_f$ or $U_fU[n,m]=U_v[n,m]$. In some implementations, $U_v[n,m]$ includes singular vectors and $U_f$ includes average of squared rooted singular values. In some implementations, $U_v[n,m]$ includes squared rooted singular values and $U_f$ includes average of singular vectors.

Next, the UE 110 compresses the decomposition matrices $U_v[n,m]$ and transmits at least one parameter associated with the decomposition matrices of the covariance matrices to the BS 121. In particular, $u_{v,ij}[n,m]$ represents an entry in row i and column j of $U_v[n,m]$. The entries $u_{v,ij}$ at different frequencies (M number in total) in time n form vector $U_{v,ij}[n]$.

The vectors $U_{v,ij}[n]$ are compressed by: (1) being projected onto 1D frequency basis vectors; or (2) being represented as linear combination of 1D sinusoids vectors. More specifically, after compression, the compressed decomposition vectors can be represented as:

$$U_{v,ij}[n]=\Sigma_{k=1}^M c_{ijk}[n]b_k$$

while $b_k$ is known parameter by both the UE 110 and the BS 121.

Figure 4G:
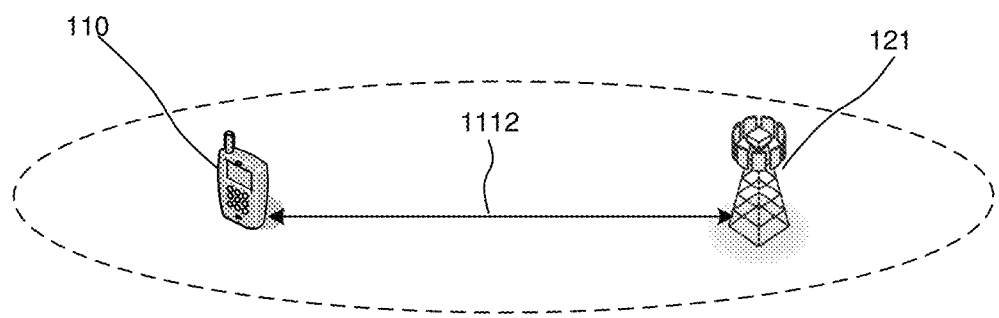

The UE 110 selects a subset $S_{ij}[n]$ from the 1D frequency basis vectors (or from 1D sinusoids vectors) and coefficients ($c_{ijk}[n]$:k∈$S_{ij}[n]$) corresponding to the subset, and then, as shown in FIG. 4G, transmits the CSI 1112 including the $U_f$, the subset $S_{ij}[n]$ and the corresponding coefficients ($c_{ijk}[n]$: k∈$S_{ij}[n]$) to the BS 121.

Then the BS 121 reconstructs vectors $U_{v,ij}[n]$ by $U_{v,ij}[n]=\Sigma_{k\in S_{ij}[n]}c_{ijk}[n]b_k$ according to the subset $S_{ij}[n]$ and the corresponding coefficients ($c_{ijk}[n]$:k∈$S_{ij}[n]$), and reconstructs covariance matrices $\Psi[n,m]$ from the $U_{v,ij}[n]$ and the $U_f$ and derives precoders W from the covariance matrices $\Psi[n,m]$ with e.g., eigenvalue decomposition or singular value decomposition (SVD).

Then, the BS 121 transmits subsequent PDSCHs to the UE 110 by using the precoders W.

It should be noted that the parameters associated with 2D time-frequency basis matrices projection, 1D frequency basis vectors projection, linear combination of 2D sinusoids matrices and linear combination of 1D sinusoids vectors may be calculated by algorithms of 2D-discrete Fourier transform (DFT), 2D-estimating signal parameter via rotational invariance techniques (ESPRIT), 2D-multiple signal classification (MUSIC), 1D-DFT, 1D-ESPRIT and 1D-MUSIC.

Figure 5:
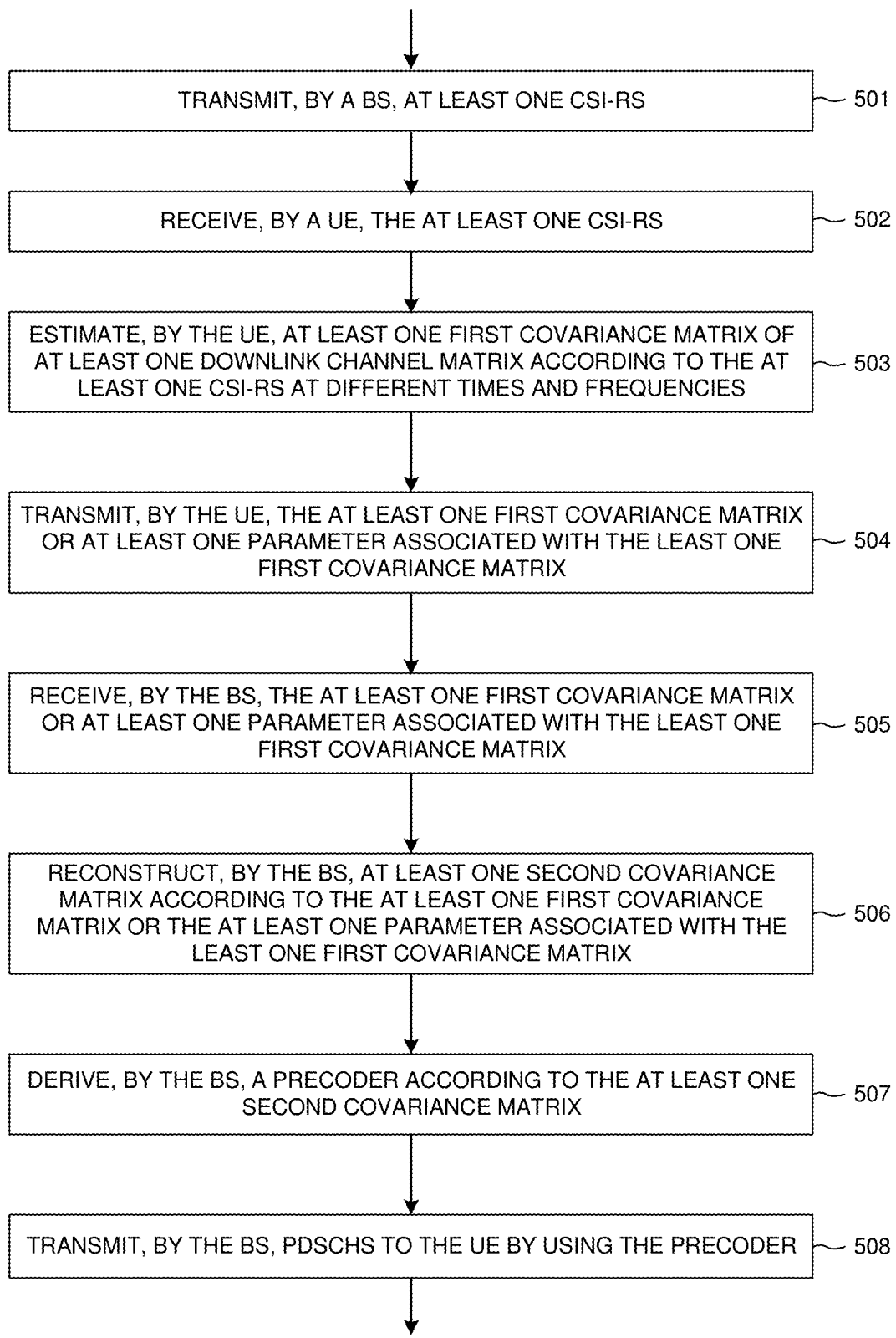
FIG. 5 is a flow chart of a method for determining precoder of MIMO system in accordance with embodiments of the current invention.

FIG. 5 is a flow chart of a method for determining precoder of MIMO system in accordance with one novel aspect. In step 501, a BS transmits at least one CSI-RS to a UE. In step 502, the UE receives the at least one CSI-RS. In step 503, the UE estimates at least one first covariance matrix of at least one downlink channel matrix according to the at least one CSI-RS at different times and frequencies.

In step 504, the UE transmits the at least one first covariance matrix or at least one parameter associated with the least one first covariance matrix to the BS. In step 505, the BS receives the at least one first covariance matrix or at least one parameter associated with the least one first covariance matrix from the UE.

In step 506, the BS reconstructs at least one second covariance matrix according to the at least one first covariance matrix or the at least one parameter associated with the least one first covariance matrix. In step 507, the BS derives a precoder according to the at least one second covariance matrix. In step 508, the BS transmits PDSCHs to the UE by using the precoder.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving, by a user equipment (UE), at least one channel state information-reference signal (CSI-RS) from a network;
   estimating, by the UE, at least one covariance matrix of at least one downlink channel matrix according to the at least one CSI-RS at different times and frequencies;
   transmitting, by the UE, at least one parameter associated with the least one covariance matrix to the network; and
   compressing, by the UE, the at least one covariance matrix, wherein the at least one covariance matrix is compressed by:
   being projected onto at least one two-dimension (2D) time-frequency basis matrix or onto at least one one-dimension (1D) frequency basis vector; or
   being represented as at least one linear combination of 2D sinusoids matrix or as at least one linear combination of 1D sinusoids vector.

2. The method of claim 1, wherein the least one parameter associated with the least one covariance matrix includes:
   a subset of: the at least one 2D time-frequency basis matrix, the at least one 1D frequency basis vector, the at least one 2D sinusoids matrix or the at least one 1D sinusoids vector; and
   at least one coefficient corresponding to the subset.

3. A method, comprising:
   transmitting, by a base station (BS), at least one channel state information-reference signal (CSI-RS) to a user equipment (UE) for the UE to estimate at least one first covariance matrix of at least one downlink channel matrix according to the at least one CSI-RS at different times and frequencies;
   receiving, by the BS, at least one parameter associated with the least one first covariance matrix from the UE, wherein the first covariance matrix is compressed by:
being projected onto at least one two-dimension (2D) time-frequency basis matrix or onto at least one one-dimension (1D) frequency basis vector or being represented as at least one linear combination of 2D sinusoids matrix or as at least one linear combination of 1D sinusoids vector;
reconstructing, by the BS, at least one second covariance matrix according to the at least one parameter associated with the least one first covariance matrix; and
deriving, by the BS, a precoder according to the at least one second covariance matrix.

4. A user equipment (UE) comprising:
a transceiver that receives at least one channel state information-reference signal (CSI-RS) from a network; and
a channel state information (CSI) handling circuit that estimates at least one covariance matrix of at least one downlink channel matrix according to the at least one CSI-RS at different times and frequencies, and compresses the at least one covariance matrix, wherein the at least one covariance matrix is compressed by:
being projected onto at least one two-dimension (2D) time-frequency basis matrix or onto at least one one-dimension (1D) frequency basis vector; or
being represented as at least one linear combination of 2D sinusoids matrix or as at least one linear combination of 1D sinusoids vector;
wherein the transceiver transmits at least one parameter associated with the least one covariance matrix to the network.

5. The UE of claim 4, wherein the least one parameter associated with the least one covariance matrix includes:
a subset of: the at least one 2D time-frequency basis matrix, the at least one 1D frequency basis vector, the at least one 2D sinusoids matrix or the at least one 1D sinusoids vector; and
at least one coefficient corresponding to the subset.

6. A method, comprising:
receiving, by a user equipment (UE), at least one channel state information-reference signal (CSI-RS) from a network;
estimating, by the UE, at least one covariance matrix of at least one downlink channel matrix according to the at least one CSI-RS at different times and frequencies;
transmitting, by the UE, at least one parameter associated with the least one covariance matrix to the network;
calculating, by the UE, a decomposition matrix of the at least one covariance matrix; and
compressing, by the UE, the decomposition matrix, or decomposing, by the UE, the decomposition matrix into a first term and a second term, wherein the first term is time-frequency varying, the second term is time-frequency fixed, and the decomposition matrix is a matrix product of the first term and the second term.

7. The method of claim 6, wherein the UE compresses the decomposition matrix, and wherein the decomposition matrix is compressed by:
being projected onto at least one two-dimension (2D) time-frequency basis matrix or onto at least one one-dimension (1D) frequency basis vector; or
being represented as at least one linear combination of 2D sinusoids matrix or as at least one linear combination of 1D sinusoids vector.

8. The method of claim 7, wherein the least one parameter is associated with the decomposition matrix of the least one covariance matrix, and includes:
a subset of: the at least one 2D time-frequency basis matrix, the at least one 1D frequency basis vector, the at least one 2D sinusoids matrix or the at least one 1D sinusoids vector; and
at least one coefficient corresponding to the subset.

9. The method of claim 6, wherein the UE decomposes the decomposition matrix, further comprising:
compressing, by the UE, the first term of the decomposition matrix, and the first term of the decomposition matrix is compressed by:
being projected onto at least one two-dimension (2D) time-frequency basis matrix or onto at least one one-dimension (1D) frequency basis vector; or
being represented as at least one linear combination of 2D sinusoids matrix or as at least one linear combination of 1D sinusoids vector.

10. The method of claim 9, wherein the least one parameter is associated with the first term of the decomposition matrix of the least one covariance matrix, and includes:
a subset of: the at least one 2D time-frequency basis matrix, the at least one 1D frequency basis vector, the at least one 2D sinusoids matrix or the at least one 1D sinusoids vector; and
at least one coefficient corresponding to the subset.

11. The method of claim 6, wherein the UE decomposes the decomposition matrix, and wherein
the first term includes at least one singular vector, and the second term includes an average of at least one squared rooted singular value; or
the second term includes the at least one singular vector and the first term includes the average of the at least one squared rooted singular value.

12. A user equipment (UE) comprising:
a transceiver that receives at least one channel state information-reference signal (CSI-RS) from a network; and
a channel state information (CSI) handling circuit that estimates at least one covariance matrix of at least one downlink channel matrix according to the at least one CSI-RS at different times and frequencies, calculates a decomposition matrix of the at least one covariance matrix, and compresses the decomposition matrix or decomposes the decomposition matrix into a first term and a second term, wherein the first term is time-frequency varying, the second term is time-frequency fixed, and the decomposition matrix is a matrix product of the first term and the second term;
wherein the transceiver transmits at least one parameter associated with the least one covariance matrix to the network.

13. The UE of claim 12, wherein the CSI handling circuit compresses the decomposition matrix by:
being projected onto at least one two-dimension (2D) time-frequency basis matrix or onto at least one one-dimension (1D) frequency basis vector; or
being represented as at least one linear combination of 2D sinusoids matrix or as at least one linear combination of 1D sinusoids vector.

14. The UE of claim 13, wherein the least one parameter is associated with the decomposition matrix of the least one covariance matrix, and includes:
a subset of: the at least one 2D time-frequency basis matrix, the at least one 1D frequency basis vector, the at least one 2D sinusoids matrix or the at least one 1D sinusoids vector; and
at least one coefficient corresponding to the subset.

15. The UE of claim 12, wherein the CSI handling circuit compresses the first term of the decomposition matrix by:
being projected onto at least one two-dimension (2D) time-frequency basis matrix or onto at least one one-dimension (1D) frequency basis vector; or
being represented as at least one linear combination of 2D sinusoids matrix or as at least one linear combination of 1D sinusoids vector.

16. The UE of claim 15, wherein the least one parameter is associated with the first term of the decomposition matrix of the least one covariance matrix, and includes:
a subset of: the at least one 2D time-frequency basis matrix, the at least one 1D frequency basis vector, the at least one 2D sinusoids matrix or the at least one 1D sinusoids vector; and
at least one coefficient corresponding to the subset.

17. A method, comprising:
transmitting, by a base station (BS), at least one channel state information-reference signal (CSI-RS) to a user equipment (UE) for the UE to estimate at least one first covariance matrix of at least one downlink channel matrix according to the at least one CSI-RS at different times and frequencies;
receiving, by the BS, at least one parameter associated with the least one first covariance matrix from the UE, wherein a decomposition matrix of the at least one covariance matrix is calculated by UE and the decomposition matrix is compressed by the UE or the decomposition matrix is decomposed by the UE into a first term and a second term, wherein the first term is time-frequency varying, the second term is time-frequency fixed, and the decomposition matrix is a matrix product of the first term and the second term;
reconstructing, by the BS, at least one second covariance matrix according to the at least one parameter associated with the least one first covariance matrix;
deriving, by the BS, a precoder according to the at least one second covariance matrix.

* * * * *